United States Patent

[11] 3,590,978

| [72] | Inventors | Roy W. Carnes<br>Henrico County;<br>Fred D. Marasso, Richmond; Robert E.<br>Rademacher, Henrico County, all of, Va. |
|---|---|---|
| [21] | Appl. No. | 763,099 |
| [22] | Filed | Sept. 27, 1968 |
| [45] | Patented | July 6, 1971 |
| [73] | Assignee | AMF Incorporated |

[54] AUTOMATIC LOADING APPARATUS
4 Claims, 7 Drawing Figs.

[52] U.S. Cl. ................................................ 198/35
[51] Int. Cl. .......................................... B65g57/081
[50] Field of Search .................................. 198/35;
214/6 M, 59, 164, 160, 237, 154

[56] References Cited
UNITED STATES PATENTS
2,790,536  4/1957  Reed .......................... 198/35

| 2,801,728 | 8/1957 | Temple | 53/59 UX |
| 2,897,950 | 8/1959 | Reed | 198/35 |
| 2,977,733 | 4/1961 | Pearce | 53/154 |
| 3,367,823 | 2/1968 | Clausen | 198/35 X |

Primary Examiner—Gerald M. Forlenza
Assistant Examiner—Frank E. Werner
Attorneys—George W. Price and Barry H. Fishkin ABSTRACT: Apparatus for loading articles comprising means for advancing two articles to a gating means, means for opening the gating means after both articles arrive thereat, means for placing one of the two articles in a receptacle, means for advancing the other article to a second gating means, means for moving the receptacle to a position opposite the last named advancing means, means for opening the second gating means in a timed relationship to the receptacle advancing means and means for placing the other article in said receptacle.

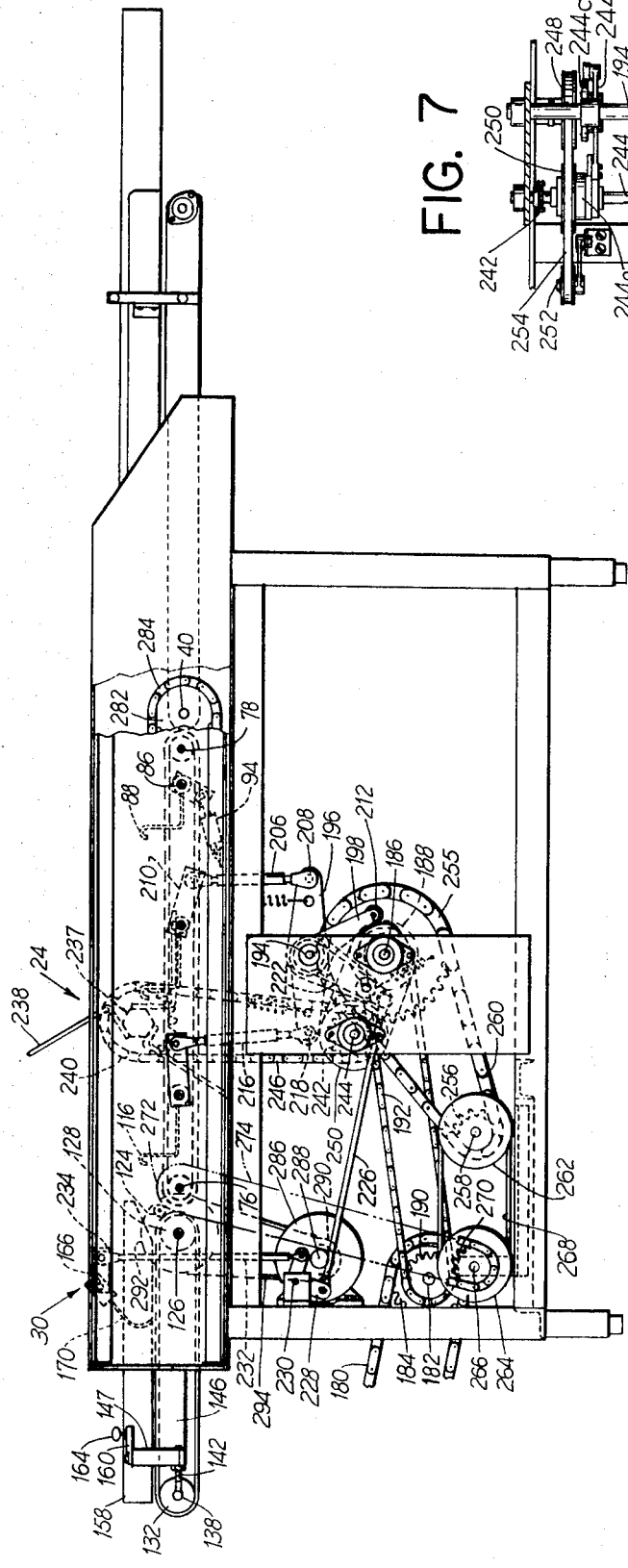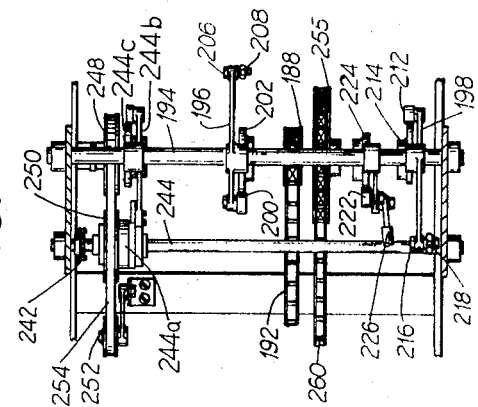

AUTOMATIC LOADING APPARATUS

BACKGROUND

This application relates to article grouping and transferring apparatus and more particularly to apparatus for loading articles into the flights of a flighted conveyor.

In automatic materials handling prior art apparatus already exists to handle a succession of like articles for packaging, bagging or similar operations. One of the major problems in automatic operations has been to load articles into automatic packaging systems. It has been particularly troublesome to load two layers of articles into a flighted infeed conveyor.

RELATING TO COPENDING APPLICATION

The apparatus disclosed in this application may be used in conjunction with the apparatus disclosed in the asignee's copending application entitled "Universal Bagger" Ser. No. 763,100, filed on even date herewith.

SUMMARY

It is, therefore, an object of this invention for provide an automatic loading apparatus.

It is a further object of this invention to invert one of two like groups of articles and advance them into a receptacle in bottom to bottom relationship.

It is still further object of this invention to provide apparatus for metering two groups of conveyored articles and inserting them into a single receptacle passing across the ends of the conveyors.

In accordance with these and other objects the invention comprises means for advancing two groups of articles to a first position, means for inverting one of said two groups of articles and loading it into a receptacle means for advancing the second group of articles through gating means to a second position, and means for advancing the second group of articles from the second position to insert it in the same receptacle on top of the first group of articles.

DESCRIPTION OF DRAWINGS

FIG. 3 is a side elevation view of the apparatus partially in section.

FIG. 7 is a plan view of a portion of the operating mechanism of the apparatus.

DESCRIPTION OF PREFERRED EMBODIMENT

Figure 1:
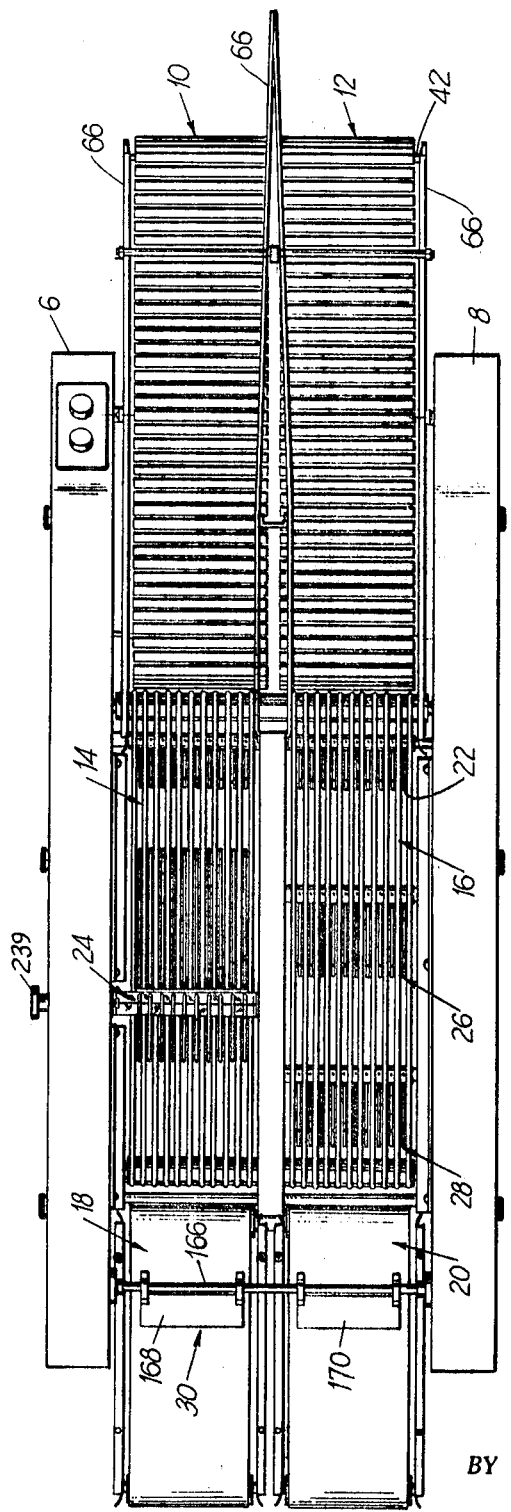
FIG. 1 is a plan view of the apparatus.
Figure 2:
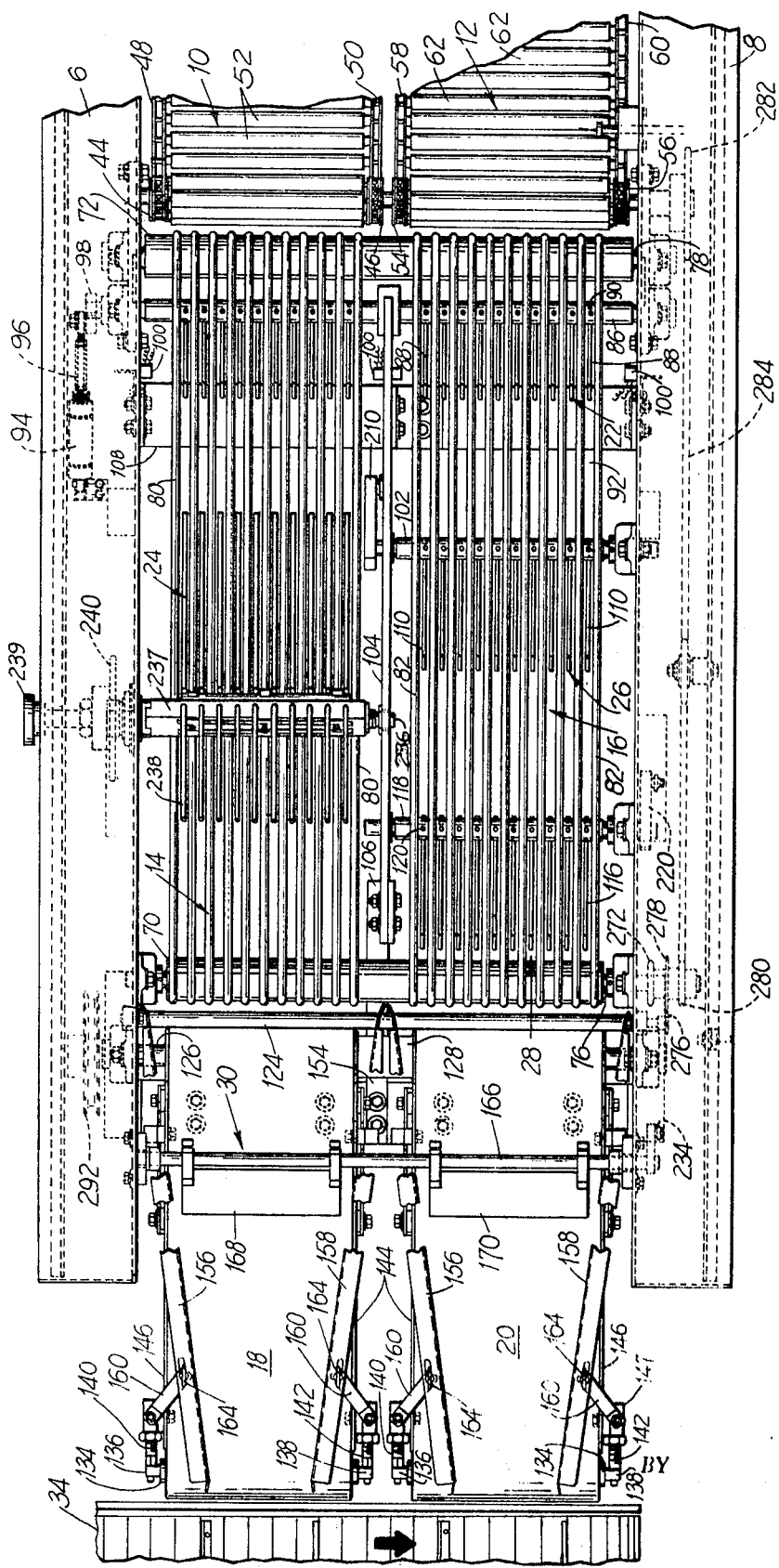
FIG. 2 is a enlarged plan view of a portion of the apparatus shown in FIG. 1.

With reference to the drawings a preferred embodiment of the invention may comprise spaced frame members 6 and 8, first and second infeed roller conveyors 10 and 12 mounted side by side between frame members 6 and 8, a spring conveyor assembly 14 in line with infeed conveyor 10, a spring conveyor assembly 16 in line with infeed roller 12, a conveyor belt 18 in line with spring conveyor 14 and a conveyor belt 20 in line with spring conveyor 16. A transverse row of gating fingers 22 are mounted adjacent the leading edges of spring conveyors 14 and 16. An inverter assembly 24 is mounted intermediate the ends of spring conveyor 14. A second transverse row of gating fingers 26 is mounted intermediate the ends of conveyor 16 and a third transverse row of gating fingers 28 is mounted adjacent the rear of spring conveyor 16. An overhead indexing pad assembly 30 is mounted above conveyor belts 18 and 20 and is adapted to engage articles thereon. The conveyor belts 18 and 20 are operable to receive groups of articles from spring conveyors 14 and 16 and deliver them to a single pocket 32 of the flighted infeed conveyor 34 driven across the end thereof, as seen in FIG. 2.

This flighted infeed conveyor 34 could be the infeed conveyor of a bagging machine such as that disclosed in the assignee's copending application Ser. No. 763,100, filed on even date herewith.

Infeed roller conveyors 10 and 12 are mounted on a driven shaft 40 rotatably mounted between frame members 6 and 8 and an idler shaft 42 rotatably mounted between frame members 6 and 8 in spaced relationship with shaft 40.

Infeed roller conveyor 10 includes a pair of sprockets 44 and 46 mounted on shaft 40 and a pair of corresponding sprockets (not shown) mounted on shaft 42 in spaced relationship therewith. An endless chain 48 is mounted over sprocket 44 and over the sprocket on shaft 42 in spaced relationship therewith and a chain 50 is mounted over sprocket 46 and the sprocket on shaft 42 in spaced relationship therewith. A plurality of rollers are rotatably mounted between endless chains 48 and 50 in the manner shown in FIG. 2.

In a like manner, infeed roller conveyor 12 includes a pair of sprockets 54 and 56 mounted on shaft 40 and a pair of sprockets (not shown) mounted on shaft 42 in spaced relationship therewith. An endless chain 58 is mounted over sprocket 54 and the sprocket in spaced relationship therewith on shaft 42 and an endless chain 60 is mounted over sprocket 56 and the sprocket in spaced relationship therewith on shaft 42. A plurality of rollers 62 are rotatably mounted between endless chains 58 and 60 in the manner shown in FIG. 2.

A sprocket 64 is mounted on shaft 40 to drive conveyors 10 and 12 in a manner set forth in detail hereinbelow. Guide members 66 are mounted along the sides of infeed roller conveyors 10 and 12.

Spring conveyors 14 and 16 are mounted over a pair of spaced rollers 70 and 72, roller 70 being mounted on a driven shaft 76 and roller 72 being mounted on a idler shaft 78. Shafts 76 and 78 are rotatably mounted between frame members 6 and 8.

A first plurality of spaced springs 80 are mounted on rollers 70 and 72 to form the spring conveyors 14 and a second plurality of spaced springs 82 are mounted on rollers 70 and 72 to form spring conveyor 16. The spring conveyors 14 and 16 are driven from shaft 76 as set forth in detail hereinbelow.

The transverse row of gating fingers 22 is mounted on a shaft 86 mounted between frame members 6 and 8 and comprises a plurality of finger members 88, each finger member being mounted on shaft 86 by a pin 90. The finger member are mounted on shaft 86 in positions spaced from the gaps 92 between the spaced springs 80 and 82. When shaft 86 is rotated in a counterclockwise direction, the finger members 88 are pivoted through the gaps 92 to engage and stop articles being moved down the spring conveyors 14 and 16. Shaft 86 is operated by an air cylinder 94 having a piston 96 connected to an actuating lever 98 connected to the shaft. A photocell 100 mounted across each of the spring conveyors controls the operation of air cylinder 94. The photocells 100 are connected to a circuit (not shown) that operates air cylinder 94 to drop the gatings fingers 22 only when both beams are interrupted and raise them when either beams have been reestablished.

The transverse row of gating fingers 26 are mounted on a shaft 102 rotatably mounted between frame member 8 and a frame member 104 mounted between conveyors 14 and 16 below the level thereof by support members 106 and 108. The row of gating fingers includes a plurality of finger members 110 connected to the shaft 102 by pins 103. Finger members 110 are spaced along shaft 102 in such positions that they are spaced from the gaps 92 between the springs 82 that form spring conveyor 14. Shaft 102 is rotatable in a manner discussed hereinbelow to move the finger members 110 from their inactive position below the gaps 92 and there active positions above the gaps 114 shown in FIG. 3.

The transverse row of gating fingers 28 comprises a plurality of finger members 116, each mounted to a shaft 118 rotatably mounted between frame members 8 and 104, the finger members 116 being mounted along shaft 118 by pins 120 in such a manner that they are spaced from the gaps 92 between the springs 80. Shaft 118 is rotatable in a manner set forth below to move the finger members 116 from their inactive position below the level of conveyor 14 to its active position above the level thereof.

Figure 4:
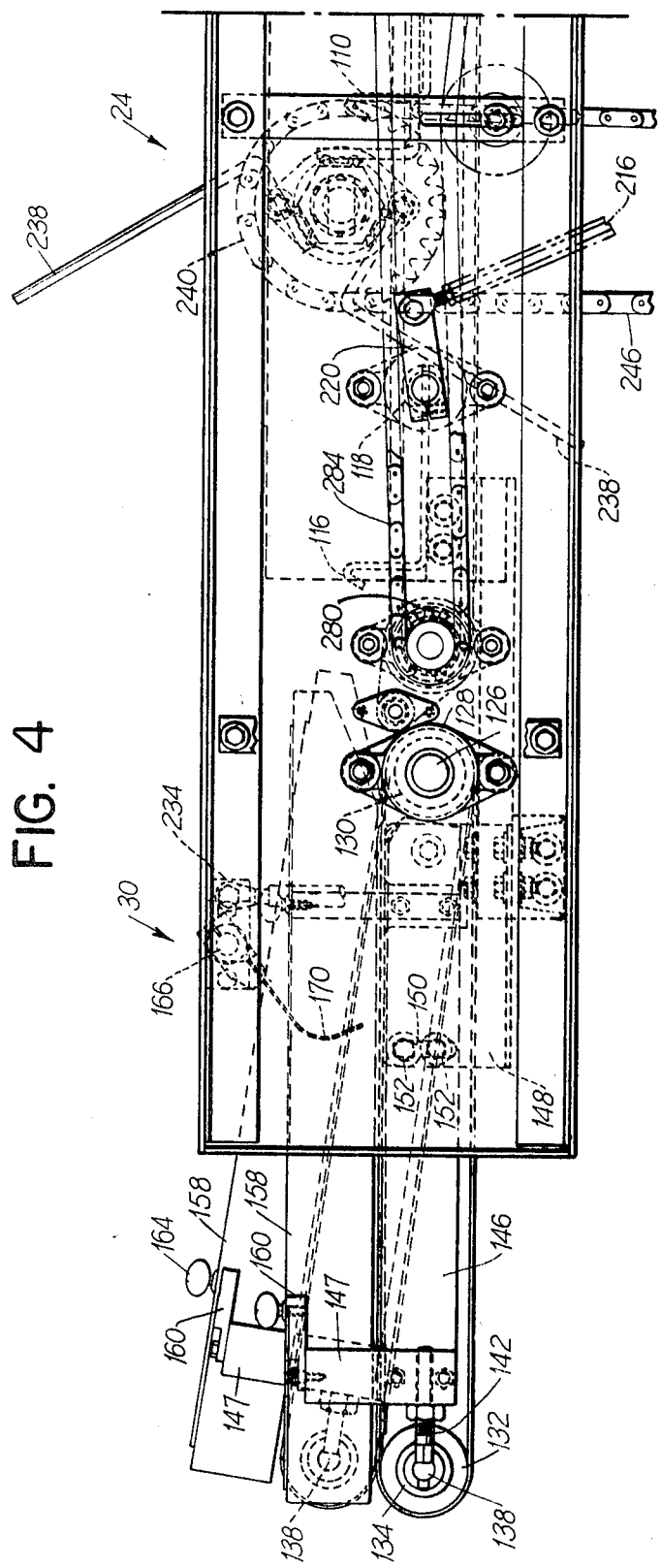
FIGS. 4 and 5, when placed side by side forms a partial side elevation view of the apparatus.
Figure 5:
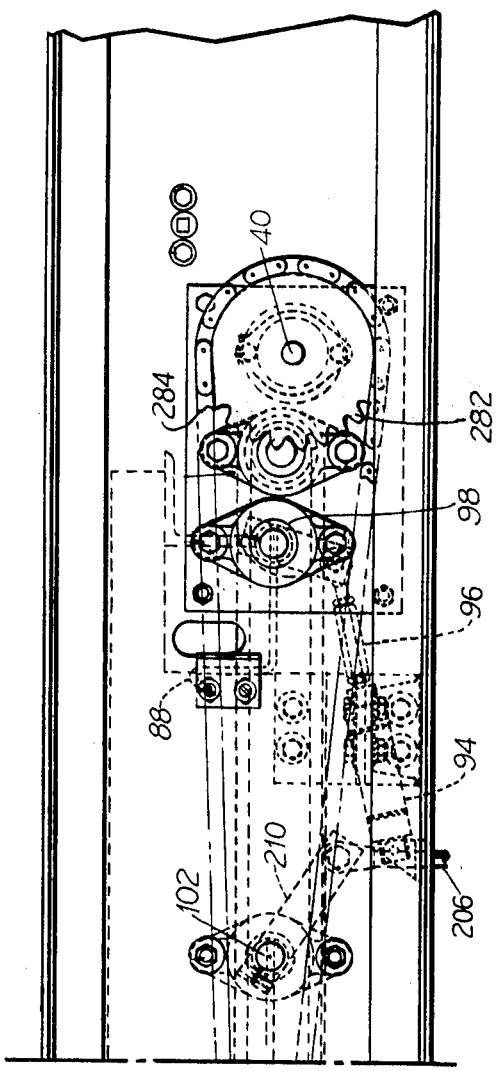
Figure 6:
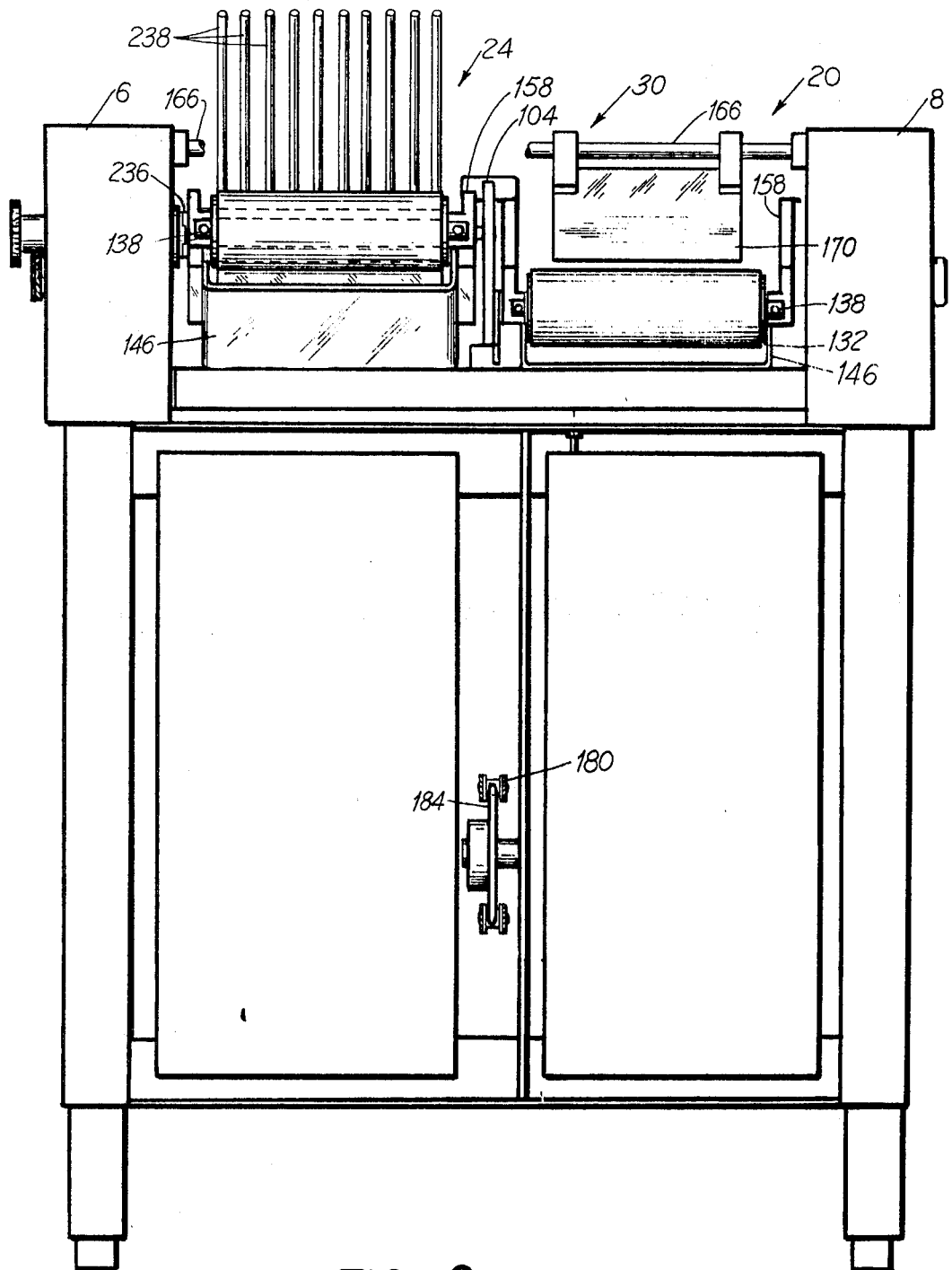
FIG. 6 is a front elevation view of the apparatus.

With reference to FIGS. 2 and 4, a driven shaft 124 is mounted behind the trailing end of spring conveyors 14 and 16 to assist articles in bridging the gap between the spring conveyors and conveyor belts 18 and 20.

A driven shaft 126 is mounted between frames 6 and 8 parallel and to the rear of shaft 124. Conveyor belts 18 and 20 are mounted on a roller 128 that is mounted for pivotal movement around shaft 126 by a bearing 130. The other ends of the conveyor belts are not fixedly connected to the frame of the apparatus and thus are cantilevered from shaft 126. This permits the distal ends of one or both of the conveyor belts to be raised.

Each conveyor belt is mounted on roller 128 and a roller 132 mounted on a shaft 134 spaced relationship thereto. The shafts 134 of each conveyor belt are supported by spaced socket joints 136 and 138, each socket joint being mounted on a rod, 140 and 142 respectively. Rods 140 and 142 are mounted to inner and outer support members 144 and 146 respectively by brackets 147. Each support member 144 and 146 is mounted at one end thereof to a bracket 148. Brackets 148 include a slot 150 therein and the frame members are mounted to the brackets by bolts 152 that are mounted in the slots. The brackets 148 mounting the outer support member 146 are connected to a side frame member 6 or 8. The brackets 148 mounting the inner frame members 144 are mounted on a cross frame member 54. With this arrangement, either one or both of the conveyor belts maybe pivoted upwardly around shaft 126 by hand and fixed in the upward position by tightening the bolts 152 against slots 150.

Opposed guide members 156 and 158 are mounted above each conveyor belt by struts 160 mounted to the brackets 147 at 162. The guide members are pivotally mounted to struts 160 at 164. The guide members converge toward the trailing ends of the conveyor belts and serve to guide articles toward the centers thereof. The guide members may be adjusted by manipulating pivotal connections 164.

The overhead indexing pad assembly 30 includes a shaft 166 pivotally mounted between frame members 6 and 8 and indexing pads 168 and 170 mounted on shaft 166 and adapted to be pivoted into the path of articles on conveyor belts 18 and 20 respectively to stop them.

Power is supplied to the instant apparatus from an external source such as the shaft 330 disclosed in assignee's copending application, Ser. No. 763,100, filed concurrently herewith.

Referring now to FIGS. 3 and 7, an endless chain 180 driven by the external source drives a shaft 182 thereto by a sprocket 184 mounted thereon. A shaft 186 is mounted parallel to shaft 182 and is driven from shaft 182 by a sprocket 188 on shaft 186, a sprocket 190 mounted on shaft 182 in spaced relationship therewith and an endless chain 192 mounted on sprocket 188 and 190.

A stationary shaft 194 is mounted above and in spaced relationship to shaft 186. A pair of bellcranks 196 and 198 are pivotally mounted on shaft 194. One end of bellcrank 196 includes a cam follower 200 adapted to ride on a cam 202 mounted on shaft 186 spaced relationship with the bell crank 196. A connecting rod 206 is mounted to the other end of bellcrank 196 by a pivotal connection 208. The other end of the connecting rod 208 is connected to an actuating lever 210 operably connected to indexing finger shaft 102.

One end of bellcrank 198 includes a cam follower 212 adapted to ride on a cam 214 mounted on shaft 186 in spaced relationship with the bellcrank 198. A connecting rod 216 is mounted to the other end of bellcrank 198 by a pivotal connection 218. The other end of connecting rod 216 is connected to an actuating lever 220 operably connected to indexing finger shaft 118.

A cam follower 222 is mounted on shaft 194 and is positioned thereon to engage a cam 224 mounted on shaft 186. One end of a connecting rod 226 is mounted to cam follower 224, the other end being connected to one end of a bellcrank 228 pivotally mounted to the frame at 230. The other end of bellcrank 228 is connected to a rod 232 that is connected to a lever 234 mounted to shaft 166 which operates indexing pads 168 and 170.

Thus, the indexing finger assemblies 26 and 28 and indexing pad assembly 30 are operated by cams mounted on shaft 186 and the timing of the raising and lowering of these indexing assemblies is controlled by the shape of cams 202, 214 and 222.

Inverter assembly 24 includes a shaft 236 rotatably mounted between frame members 6 and 104, a hexagonal member 237 and three groups of inverting fingers 238 mounted at spaced intervals around hexagonal members 237. Each group of inverting fingers are mounted in positions along shaft 236 such that they are in spaced relationship with the gaps in spring conveyor 14 so that as the shaft rotates the group of inverter fingers rise between the gaps in the spring conveyor, engage the articles thereon and then flip them over as the shaft continues to rotate. The inverter assembly is removable from the apparatus by unscrewing a handle members 239.

Shaft 236 is rotated by a sprocket 240 mounted thereon, a sprocket 242 mounted on a shaft 244 and a chain 246 mounted over sprockets 240 and 242. Shaft 244 is rotated from shaft 186 by a belt and pulley assembly including a pulley 248 mounted on shaft 186, a pulley 250 mounted on shaft 244, a belt tensioning pulley 252 and a drive belt 254 mounted over the three pulleys. A clutch 244a is mounted on shaft 244 and is operable to stop the rotation thereof. Clutch 244a is operated by a bellcrank 244b by a cam 244c on shaft 186. As bell crank 244b intermittently operates clutch 244a shaft 244 is turned intermittently, thus rotating inverter 24 intermittently.

Conveyors 10, 12, 14 and 16 are driven from shaft 186. A sprocket 255 is mounted on shaft 186 and a sprocket 256 is mounted in spaced relationship thereto on a shaft 258. A chain 260 mounted over sprockets 254 and 256 drives shaft 258 from shaft 186. A pulley 262 is mounted on shaft 258 and a pulley 264 is mounted on a shaft 266 in spaced relationship thereto. A belt 268 mounted over pulleys 262 and 264 drives shaft 266 from shaft 258. A sprocket 270 is mounted on shaft 166 and a sprocket 272 is mounted on shaft 76 in spaced relationship therewith. Shaft 76 is driven from shaft 266 by a chain 274 mounted over sprockets 270 and 272. Shaft 76 drives spring conveyors 14 and 16.

Shaft 124 is driven from shaft 76 by a sprocket 276 mounted on shaft 124, a sprocket 278 mounted on shaft 76 and a chain 280 mounted over sprockets 276 and 278. The infeed roller conveyors 10 and 12 are driven from shaft 76 by a sprocket 280 mounted thereon, a sprocket 282 mounted on infeed roller conveyor drive shaft 40 and a chain 284 mounted over sprockets 280 and 282.

Conveyor belts 18 and 20 are driven by a separate motor 286 having an output shaft 288. A pulley 290 is mounted to output shaft 288 and a pulley 292 is mounted on shaft 126 in spaced relationship thereto. A drive belt 294 is mounted over pulleys 290 and 292 to drive shaft 126 from output shaft 288.

In operation, articles (which term is used to cover a single article or a group thereof) is advanced down roller conveyors 10 and 12 and the forward portion of spring conveyors 14 and 16 until they break the beam of one of the photocells 100. The gating finger assembly 22 is normally positioned with finger 88 above gaps 92 so as to be operable to halt articles. If the length of the articles is greater than the distance between the gating finger assembly 22 and the trailing end of roller conveyors 10 and 12, the rollers 52 and 62 will rotate to preclude crushing the articles against the fingers. The springs of spring conveyors 14 and 16 are of low friction and thus they slide underneath the stopped articles.

A predetermined time after both photocell beans are broken by articles on conveyors 14 and 16, the gating finger assembly 22 lowers and the spring conveyors advance the articles to the left as seen in the drawings. The spring conveyors 14 and 16 are driven at a faster speed than roller conveyors 10 and 12 to provide a gap between the articles being advanced down each of the conveyor paths. This permits the beams of each of the photocells 100 to be reestablished and the fingers 88 to be raised after articles are advanced therepast to prepare the gating assembly 22 for the next pair of articles being advanced down roller conveyors 10 and 12 to spring conveyors 14 and 16. The article on spring conveyor 14 is advanced to the area of the inverter 24, turned upside down thereby and advanced down the remainder of the spring conveyor 14 over shaft 124 and on to a conveyor belt 18. Indexing pad assembly 30, being operated by a cam operates in a predetermined timed sequence which can be timed to the indexing of flighted infeed conveyor 34. Therefore, indexing pad 168 will be raised away from conveyor belt 18 when the travel of the remainder of the conveyor belt will insert the article into a flight of the flighted infeed conveyor.

The gating of gating finger assemblies 26 and 28 is such to slow down the article on spring conveyor 16 such that, in conjunction with the action of gating pad 170, the article on spring conveyor 16 will eventually be delivered by conveyor belt 20 to the same flight of flighted infeed conveyor 34 that includes the article received from conveyor belt 18. In this mode of operation, the trailing edge of conveyor belt 20 is raised so that an article delivered thereby will be placed in the flight of the flighted infeed conveyor on top of the article already placed therein by conveyor belt 18.

If it is desired to utilize the apparatus to deliver single layers of articles to flighted infeed conveyor 34, inverter assembly 24 is removed. Articles will then be fed down infeed roller conveyor 10, spring conveyor 14 and conveyor belt 18 to the flighted infeed conveyor. The photocell 100 across spring conveyor 16 will be blocked off by a shield and the only gating will be effected by the photocell across spring conveyor gating pad 168.

We claim:

1. Apparatus for loading articles into the flights of a flighted conveyor, which comprises:
   first and second conveyor means mounted for advancing articles to the flighted conveyor,
   first gating means mounted adjacent the first and second conveyor means for blocking movement of articles thereon until an article is present thereat on each of the conveyor means,
   means for opening the first gating means after both articles arrive thereat,
   second gating means mounted adjacent the second conveyor means for blocking movement of the article thereon for a time interval while the article present on the first conveyor is being moved by the first conveyor toward the flighted conveyor,
   means for driving the flighted conveyor,
   means for placing articles into flights of the flighted conveyor, and
   means for driving the first and second conveyor means in timed relationship with the flighted conveyor so that the article on the second conveyor is deposited into the same flight of the flighted conveyor as is the article on the first conveyor.

2. Apparatus for loading articles according to claim 1, wherein the first gating means comprises:
   a plurality of finger means disposed to block the movement of both articles,
   photoelectric means for sensing the presence of both articles, and
   means for moving the finger means out of their blocking position after both articles are sensed at the finger means.

3. Apparatus for loading articles according to claim 1, wherein the second gating means comprises:
   spaced sets of finger members.

4. Apparatus for loading articles according to claim 1, wherein:
   said means for placing the articles includes means for raising the article of the second conveyor so that that article is placed on top of the article of the first conveyor.